July 15, 1952 R. H. RANGER 2,603,777
RADIO SYSTEM
Filed Feb. 25, 1944 3 Sheets-Sheet 1

INVENTOR
RICHARD H. RANGER
BY William D. Hall.
ATTORNEY

INVENTOR
RICHARD H. RANGER
BY William D. Hall.
ATTORNEY

July 15, 1952 — R. H. RANGER — 2,603,777
RADIO SYSTEM
Filed Feb. 25, 1944 — 3 Sheets-Sheet 3

INVENTOR
RICHARD H. RANGER
BY William D. Hall
ATTORNEY

Patented July 15, 1952

2,603,777

UNITED STATES PATENT OFFICE 2,603,777

RADIO SYSTEM

Richard H. Ranger, United States Army, Newark, N. J.

Application February 25, 1944, Serial No. 523,930

9 Claims. (Cl. 343—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to devices for locating and determining the distance of aircraft and other objects from a definite station, and to provide information to enable an observer to predict the future movements of the aircraft.

Devices of the radio object locator type have been used heretofore to determine the instantaneous position and distance of aircraft, but such determinations are insufficient should the aircraft change its course or resort to certain evasive actions.

It is an object of this invention to provide apparatus by means of which an observer skilled in the manipulation of military aircraft is enabled to predict the actions of an enemy aircraft over a known terrain.

A further object is the provision of a device for determining simultaneously the azimuth, altitude and horizontal distance of aircraft from a fixed station, together with the straight line distance.

A further object is the provision of a device for use in connection with radio object locator apparatus for locating aircraft and thereafter following the movements of the aircraft whereby the actions of the aircraft can be predicted.

These and other objects are attained by the novel arrangements and methods hereinafter described and illustrated by the accompanying drawings, in which.

Figure 1:
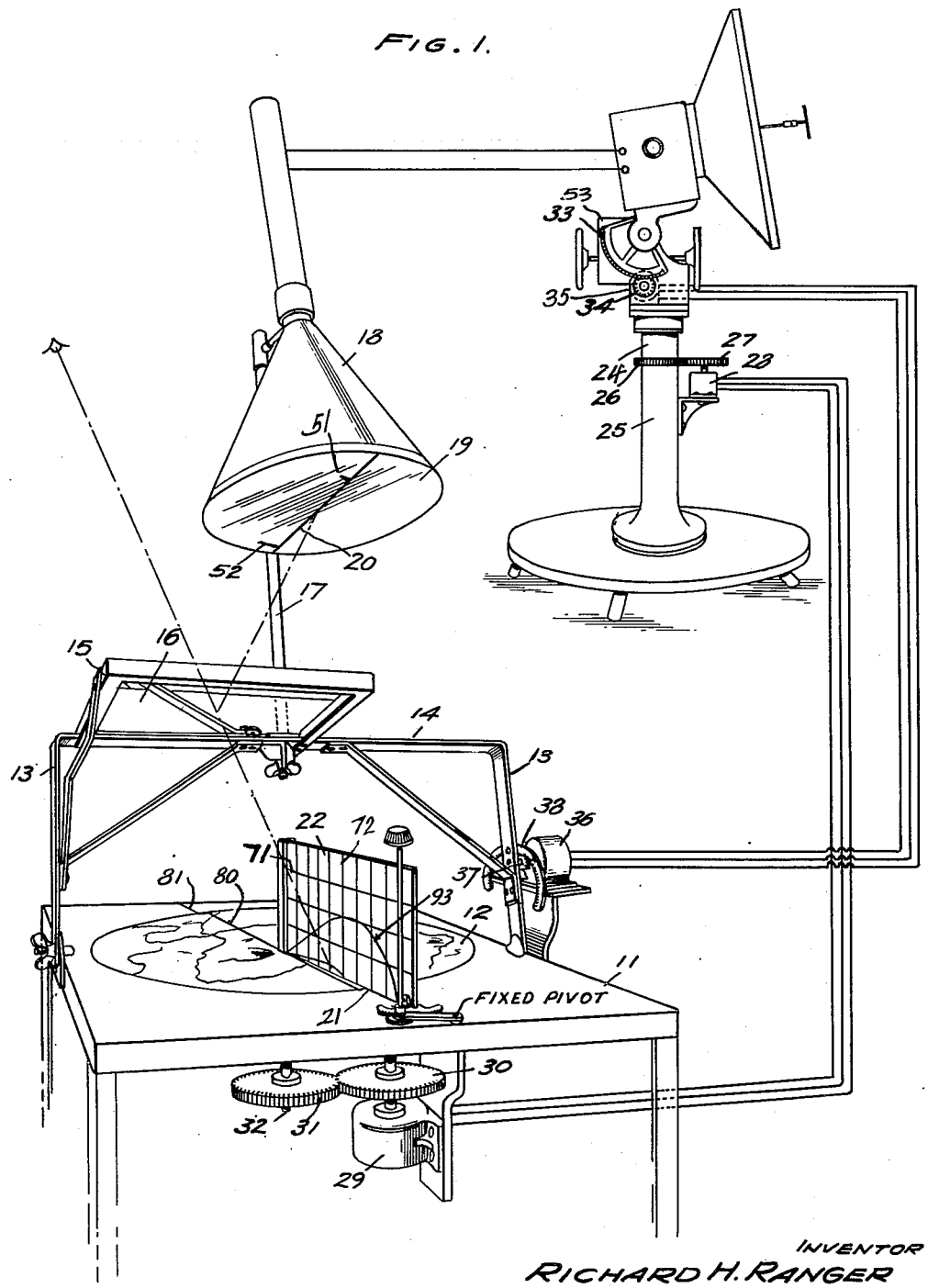
Fig. 1 is a perspective view of a device embodying the invention.

Referring to the drawings, the apparatus is shown to comprise a table 11 having rotatably mounted thereon a disc 12 covered with a map of the particular terrain under consideration. Pivotally connected to the table 11 are a pair of upstanding arms 13 connected by a cross bar 14 which supports a frame 15 carrying a half-silvered mirror 16 having transparent and reflecting properties. Mounted on the cross bar 14 is an upstanding staff 17 supporting a cathode ray tube 18 having a face 19, provided with a datum line 20 having an initial mark at 52. The face or screen portion 19 of the tube is substantially parallel to the disc when the arms 13 are vertical. In this position the axis of the tube is parallel with the axis of rotation of the disc.

The map on disc 12 is also provided with a datum line 80 which initially is alined with a mark 81 on the table. A plate of transparent material 22, having markings thereon, has its lower edge 21 initially in alinement with the datum line 80 of the map. The plate 22 is pivoted about the axis of rotation of the disc and map and projects upwardly perpendicular to the disc 12.

The cathode ray tube is connected to radio object locator apparatus 53, emitting very high frequency radio waves which are directed towards an aircraft or other object. When the waves strike the aircraft, they are reflected back to a receiver forming a part of the radio object locator apparatus, the receiver being connected to the cathode ray tube. The reflected waves produce a pip on the face of the cathode ray tube, and the distance away of the aircraft is indicated by the distance of the pip 51 on the datum line 20 from the initial mark 52.

The radio object locator device 53 is pivotally mounted on a post 24 for rotary movements in a vertical plane, and the post 24 is mounted for rotary movements in a horizontal plane on a pedestal 25. Fixed to post 24 is a gear 26 in mesh with a gear 27 of the same size, the latter gear being fixed to the shaft of a Selsyn motor 28 which is electrically connected to a Selsyn motor 29 having fixed to its shaft a gear 30 in mesh with a similar gear 31 fixed to shaft 32 upon which the disc 12 is mounted. By means of this structure, the disc 12 is caused to follow exactly the horizontal rotary movements of the post 24 and thus indicate the azimuth of the object being located.

It is to be noted that clockwise rotation of the radar azimuth is connected to give counterclockwise rotation of the map disc 12, so that the image of datum line 20 will be oriented correctly with respect to the map.

Carried by the radio object locator device 53 and moving in a vertical plane is a segmental gear 33 in mesh with a gear 34 attached to the shaft of a Selsyn motor 35, which is electrically connected to a Selsyn motor 36, having a shaft to which is fixed a gear 37 in mesh with a segmental gear 38 attached to one of the arms 13. This structure causes the arms 13 to be rotated in vertical planes following exactly the vertical movements of the radar device.

The transparent plate 22 has marked thereon horizontal lines 71 to indicate altitudes, and vertical lines 72 to indicate horizontal distances. When the face 19 of the cathode ray tube and the mirror 16 are parallel with the disc 12, the image of the datum line 20 in the mirror 16 will be parallel with the edge 21 of the glass 22. When the tube and mirror are tilted, the images of line 20 will be at an angle to the edge 21, the images and the edge meeting at the center of the disc 12.

The normal trace of the cathode ray tube produces the datum line 20, the image of which is parallel with the edge 21 of the plate 22 when the axis of the tube is parallel with the axis of rotation of the map.

The relative positions of the image of datum line 20 and edge 21 and the construction of the device is such that the image and edge determine a plane surface which is perpendicular to the plane of the map as the arms 13 and the cathode ray tube are rotated in elevation corresponding to elevation control from the radio object locator apparatus 53. The axis of the cathode ray tube is inclined to the axis of rotation of the map resulting from the pivoting of the arms on the table.

The cathode ray tube is connected to the radio object locator apparatus in such a manner that a pip 51 appears along the datum line of the screen 19 a distance from the initial mark 52 proportional to the slant height of the aircraft or other object. The scale of distance along the screen datum line 20 is the same as the scale of the map. That is, if one inch represents 10 miles on the map, one inch from mark 52 on the datum line 20 will represent 10 miles. The position of a pip 51 on the datum line 20 indicates the direct distance of the object from the radar device and the horizontal distance of the object will be the vertical projection of this distance on to the map.

Figure 2:
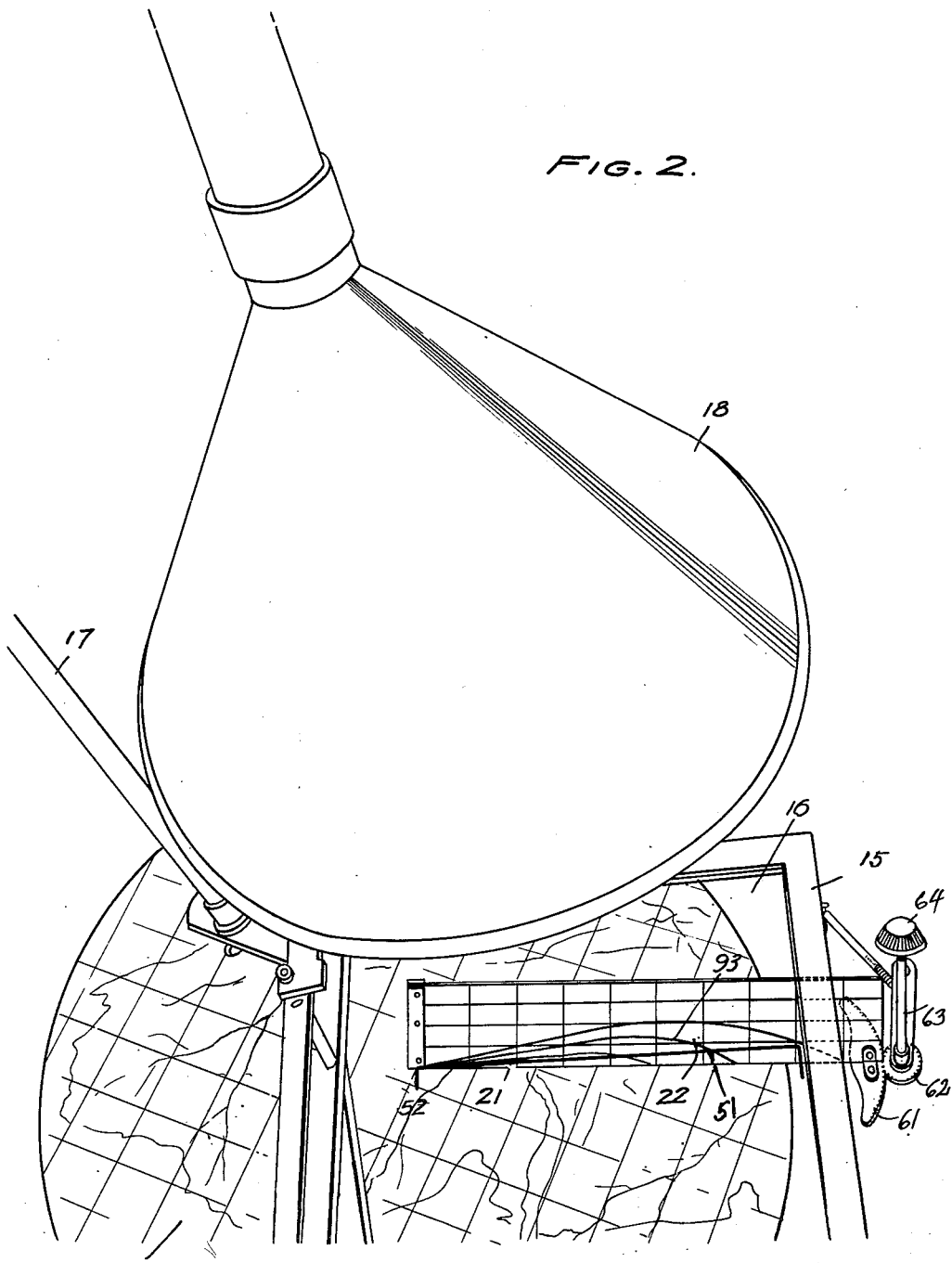
Fig. 2 is an enlarged perspective view of certain elements of the device.

In operation, when an aircraft or other object has been located by the radio object locator apparatus the disc 12 with the map will be rotated by the Selsyn motor 29 in inverse synchronism with the horizontal rotation of the radar apparatus and the definite azimuth angle will be indicated by markings on the table and map. The distance away of the object is shown by the position of the pip 51 (see Fig. 2) on the reflection of the datum line 20 in the mirror 16. An observer looking into the half-silvered mirror sees a virtual image of the datum line 20 of the screen of the cathode ray tube and the pip 51, indicating the direct distance away of the aircraft or other object being observed. The observer views the reflection of the line 20 in the mirror 16 and simultaneously views edge 21, obtaining a composite view in which the reflected line 20 appears to lie on the transparent sheet 22. When the face of the cathode ray tube is parallel with the map, the image of datum line 20 will be parallel with edge 21. As the aircraft gains in altitude, the Selsyn motors 35 and 36 connected to the radar apparatus and the arms 13 will tilt the axis of the cathode ray tube and in consequence the reflection of datum line 20 away from the map datum line 21. An observation in the mirror will now have an automatic correction for slant height since the pip 51 which represents the aircraft will appear to be suspended in space a distance above the plane of the map which corresponds in scale to the altitude of the aircraft. The image of datum line 20 will appear to meet the edge 21 at the center of the map and thence diverge therefrom at an angle dependent upon the amount of tilting of the cathode ray tube. The point where pip 51 strikes a vertical line on the transparent sheet 22 indicates the horizontal distance of the object; and where the pip 51 strikes a horizontal line indicates the altitude of the object.

Figure 3:
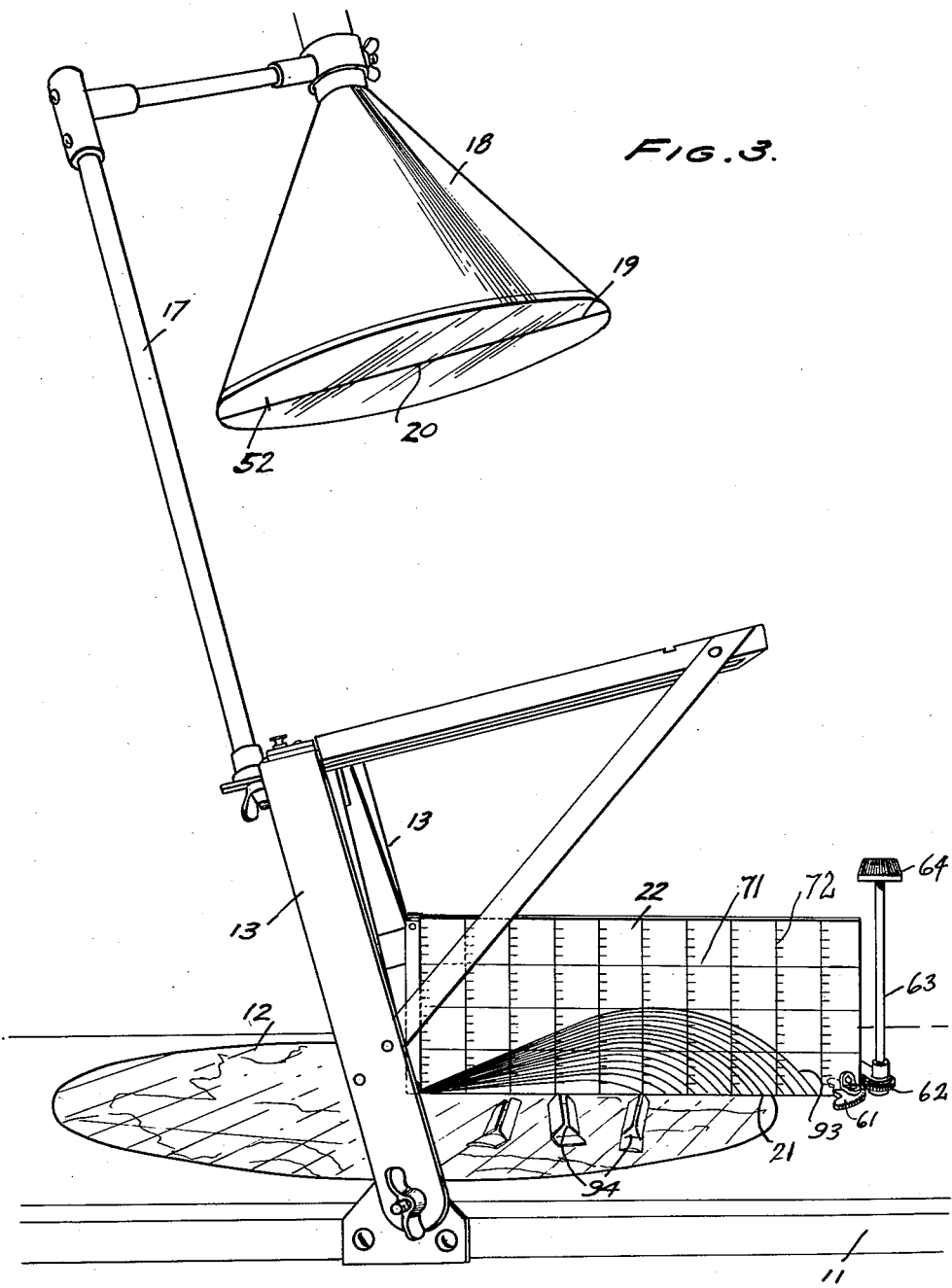
Fig. 3 is a side elevational view of the device.

There are also traced on the sheet 22 (as shown particularly in Fig. 3) a family of trajectories 93 intersecting the vertical and horizontal lines. These trajectories 93 represent possible shell paths from anti-aircraft guns located at the observation station which is taken to be the axis of rotation of the map.

In predicting the actions of an approaching aircraft, there are employed two or three observers who have had previous experience as skilled pilots and are familiar with the logical actions of various aircraft over the type of terrain under consideration, observers knowing exactly the positions of objects in the terrain which might be subjected to bombings. The observers note the location of the aircraft at short intervals, such as 10 seconds, and in this manner are able to determine the course of the aircraft as well as its mode of flying. Each observer makes his analysis of the situation, and action is taken upon the most logical of the analyses.

A timing device is placed into operation immediately upon the first location of the aircraft, the device giving a signal at 10 second intervals and the observers mark the position and altitude of the aircraft at each signal by markers 94 on the map. (See Fig. 1.) These markers 94 record the horizontal distance and the altitude of the aircraft, and the azimuth thereof, at each interval. The wind velocity can be determined by any well known means and should be taken into account.

One end of the transparent plate 22 is pivoted at the center of the disc 12 and the other end has fixed thereto a segmental gear 61, in mesh with a pinion 62, fixed to a vertical shaft 63 having a knob 64. By means of this structure the position of the transparent plate 22 can be finely adjusted, and may be moved forward or back from the active vertical datum plan to assist prognosticating where the aircraft will be and which trajectory will strike that estimated point, considering the time involved for the shell to get to the same point as the aircraft. Lines indicating fixed times of fuse setting may also be marked on the transparent plate to aid fuse setting information. The particular trajectory to be used is determined by noting upon which trajectory line 93 the image of pip 51 falls. (See Fig. 2.)

The angle of the trajectory which it is estimated will strike the plane is likewise given the guns for anti-aircraft fire.

The invention having been described, what is claimed is:

1. A device for automatically deriving the components horizontal range and altitude of an object from slant range as determined by a radio object locator comprising, a base member; a range plate having a plane surface supported in a vertical plane on said base and having inscribed thereon a system of rectangular coordinate lines having an origin and extending in horizontal and vertical directions and representing to a predetermined scale altitude and range; object range indicator including a fluorescent screen and means adapted to display thereon a luminous mark indicating slant range and a datum line defining the deflection path of said luminous range mark; a half-silvered mirror; means for adjustably supporting said range indicator and mirror for rotation about a horizontal axis through the origin on said range plate and perpendicular to the plane thereof, the indicator being so positioned on said adjustable supporting means that the datum line thereon lies in the plane of the range plate, the mirror being positioned between the axis of rotation and the face of said indicator; and positioning means controlled by the radio object locator to move said supporting means about its horizontal axis in accordance with the altitude of the object.

2. A device for automatically deriving the components horizontal range and altitude of an object from its slant range as determined by a radio object locator comprising, a table member supported in a horizontal plane, a rotatable disc having a map thereon supported on said table with the axis of rotation vertical; a transparent range plate supported on the table in a vertical plane through said axis and having inscribed on the surface thereof a system of rectangular coordinate lines having an origin positioned at the center of said disc, said lines extending parallel and perpendicular respectively to the plane of said disc and representing to a predetermined scale altitude and horizontal range; range plate having horizontal and vertical graduations inscribed thereon, a cathode ray range indicator, a half-silvered mirror, means for adjustably supporting said range indicator and half-silvered mirror for rotation about a horizontal axis through the origin of said range plate and perpendicular to the plane thereof, and means for positioning said supporting means about its horizontal axis in accordance with the elevation of the object as determined by the radio object locator, said range indicator having a zero mark and a datum line defining the deflection path of a luminous mark displayed on its face indicating slant range of the object and being so positioned above the half-silvered mirror that said datum line lies in the plane of the range plate and said zero mark when viewed by reflection in said mirror coincides with the zero of said range plate and the luminous mark appears to be on the range plate where its position may be read off said coordinate lines giving horizontal range and altitude.

3. A device for automatically resolving slant range of an object as determined by a radio object locator into the components horizontal range and altitude comprising a table member supported in a horizontal plane, a cathode ray range indicator, a half-silvered mirror, means for adjustably supporting the indicator and mirror for rotation about a horizontal axis, a range plate supported on the table with its plane surface perpendicular to said axis of rotation and having inscribed on said surface a system of rectangular coordinate lines preferably horizontal and vertical and having an origin of reference positioned on said axis, means for positioning said supporting means in accordance with the elevation of an object determined by the radio object locator, said range indicator being positioned above said half-silvered mirror and having a zero mark and a datum line defining the path of a luminous mark indicating slant range so that when viewed by reflection in said half-silvered mirror said zero mark appears coincident with said origin of coordinates and said datum line appears in the plane of the range plate and the luminous mark appears to be on the range plate at the position of the object from which horizontal range and altitude may be read off said coordinate lines.

4. A device for automatically resolving slant range of an object as determined by a radio object locator into the components horizontal range and altitude, comprising a table member supported in a horizontal plane, a cathode ray slant range indicator, a half-silvered mirror, supporting means for said indicator and mirror mounted on said table, said supporting means being adjustable to move about a horizontal axis, a range plate mounted on the table with its plane surface perpendicular to said axis, said plate having horizontal and vertical coordinate lines inscribed thereon having an origin of reference positioned on said axis, self synchronous motor means connected to the radio object locator and to the indicator supporting means for positioning the aforesaid supporting means in accordance with the elevation of the object, said range indicator having a fluorescent screen on which is displayed a zero mark and a datum line defining the path of a luminous mark indicating slant range as determined by the radio object locator, said half-silvered mirror being positioned below the range indicator midway between said horizontal axis and said fluorescent screen so that said zero mark appears coincident with said origin of coordinates and said datum line appears to lie in the plane of the range plate and said luminous mark when viewed by reflection in the mirror appears to be on the range plate at a position corresponding to the object.

5. A device for automatically resolving slant range of an object as determined by a radio object locator into its components horizontal range and altitude comprising a table member supported in a horizontal plane, a cathode ray slant range indicator, a half-silvered mirror having transparent and reflecting properties, a frame for supporting the range indicator and mirror pivotally mounted on said table and adapted to be tilted about a horizontal axis, a range plate with horizontal range and altitude graduations inscribed thereon mounted vertically on said table and perpendicular to the axis of tilt, the origin of said graduations coinciding with said axis, self synchronous motor means connected to the radio object locator and to said indicator supporting frame for positioning said supporting frame in accordance with the elevation of the object, said range indicator having a zero mark and a datum line defining the path of adapted to display a luminous mark on the face thereof indicating slant range, and so positioned that when viewed by reflection from said half-silvered mirror said zero mark appears coincident with the origin on the range plate and said luminous mark on said datum line appears to be located on the range plate at a position corresponding to the object from which horizontal range and altitude may be read off the graduations.

6. A device for automatically resolving slant range data of an object obtained from a radio object locator into the components horizontal range and altitude comprising a table member supported in a horizontal plane, a cathode ray slant range indicator, a half-silvered mirror having transparent and reflecting properties positioned below the range indicator, a frame for supporting the range indicator and mirror pivotally mounted on said table and adapted to be tilted about a horizontal axis, a range plate with horizontal range and altitude graduations inscribed thereon mounted vertically on the table and perpendicular to the axis of tilt, a series of trajectories inscribed on said range plate the common origin of said range graduations and trajectories lying on the axis of tilt, self synchronous motor means connected to the radio object locator and to said indicator supporting frame for positioning said supporting frame in accordance with the elevation of the object, a zero mark and a datum line on the face of said range indicator, said range indicator adapted to display a luminous pip indicating slant range derived from said object locator and so positioned that when viewed by reflection from the upper surface of said half-silvered mirror the said zero mark appears coincident with the origin on the range plate and the range pip on said datum line appears as a luminous spot on the range plate at a position corresponding to that of the object, whereby horizontal range and altitude may be read off the respective graduations and the proper gun elevation for the target read off the trajectory passing through said object position.

7. A device for use in conjunction with a radio object locator for showing the space position of an object with reference to a map comprising, a table member supported in a horizontal plane, a circular disc carrying a map pivotally mounted on said table with its axis of rotation vertical, means for positioning the disc in accordance with the azimuth of the object determined by a radio object locator, a range plate provided with horizontal and vertical graduations mounted on the table in a vertical plane above said disc the origin of said graduations lying on said vertical axis, a cathode ray range indicator having a zero mark and a datum line defining the path of a luminous mark indicating slant range, a half-silvered mirror, means for adjustably supporting said range indicator and mirror for rotation about a horizontal axis perpendicular to said range plate and through the origin thereon said mirror being positioned midway between said horizontal axis and the face of said indicator, said indicator being so positioned on said adjustable supporting means that when viewed by reflection from the mirror the zero mark on the indicator appears coincident with the origin on the range plate and the luminous mark on the datum line appears to lie on the surface of the range plate, and positioning means adapted to move said supporting means about said horizontal axis, whereby said luminous mark appears to lie on the range plate at a point above the map corresponding to the position of the object in space, in altitude, azimuth and horizontal range.

8. A device for use in conjunction with a radio object locator for showing the space position of an object with reference to its position above a map in terms of horizontal range and altitude comprising a table member supported in a horizontal plane, a circular disc pivotally mounted on said table with its axis of rotation preferably vertical, a map on said disc, self synchronous motor means connected to said radio locator and to said disc for positioning the disc in accordance with the azimuth of the object as determined by said radio object locator, a cathode ray slant range indicator and a half-silvered mirror supported on an upstanding frame pivotally mounted on the table with the axis of tilt passing horizontally through the center of said disc, a range plate having graduations giving horizontal range and altitude inscribed thereon mounted on the table with its plane perpendicular to said horizontal axis and the origin of the graduations being coincident with the center of said disc said mirror being positioned midway between said horizontal axis and the face of the indicator, self synchronous motor means connected to said object locator and to said upstanding supporting frame for positioning said supporting frame in accordance with the elevation of the object, a zero mark and a datum line inscribed on the face of said range indicator defining the path of a luminous pip indicating slant range derived from the object locator, said datum line lying in the plane of said range plate and said indicator being so positioned that when viewed by reflection from the upper surface of said half-silvered mirror said zero mark coincides with the origin on the range plate and the range pip appears as a luminous spot on the range plate at a position above the map corresponding to that of the object wherefrom horizontal range and altitude may be read off the respective graduations together with the true position on the map.

9. A device as defined in claim 8 having a series of trajectories inscribed on said range plate having a common origin and having horizontal range and altitude graduations inscribed thereon.

RICHARD H. RANGER.

REFERENCES CITED

The following references are of record in the file of this patent:

UNITED STATES PATENTS

| Number | Name | Date |
|---|---|---|
| 2,231,929 | Lyman | Feb. 18, 1941 |
| 2,426,184 | Deloraine | Aug. 26, 1947 |
| 2,430,292 | Hershberger | Nov. 4, 1947 |
| 2,440,250 | Deloraine | Apr. 27, 1948 |
| 2,444,771 | Fyler | July 6, 1948 |
| 2,518,968 | Wolff | Aug. 15, 1950 |
| 2,519,397 | Ranger | Aug. 22, 1950 |